No. 778,717. PATENTED DEC. 27, 1904.
T. L. F. STACK.
APPARATUS FOR TREATING MILK
APPLICATION FILED JUNE 3, 1901.

WITNESSES:

INVENTOR
Thomas L. F. Stack
BY
Henry Connett
ATTORNEY

No. 778,717. PATENTED DEC. 27, 1904.
T. L. F. STACK.
APPARATUS FOR TREATING MILK.
APPLICATION FILED JUNE 3, 1901.

No. 778,717. PATENTED DEC. 27, 1904.
T. L. F. STACK.
APPARATUS FOR TREATING MILK.
APPLICATION FILED JUNE 3, 1901.

No. 778,717. PATENTED DEC 27 1904.
T. L. F. STACK.
APPARATUS FOR TREATING MILK.
APPLICATION FILED JUNE 3, 1901.

Witnesses
Inventor
Thomas L. F. Stack

No. 778,717. PATENTED DEC. 27, 1904.
T. L. F. STACK.
APPARATUS FOR TREATING MILK.
APPLICATION FILED JUNE 3, 1901.

WITNESSES:

INVENTOR
Thomas L. F. Stack
BY
ATTORNEY

No. 778,717. PATENTED DEC. 27, 1904.
T. L. F. STACK.
APPARATUS FOR TREATING MILK.
APPLICATION FILED JUNE 3, 1901.

Witnesses

Inventor
Thomas L. F. Stack

No. 778,717.

PATENTED DEC. 27, 1904.

T. L. F. STACK.
APPARATUS FOR TREATING MILK.
APPLICATION FILED JUNE 3, 1901.

No. 778,717.                                    Patented December 27, 1904.

UNITED STATES PATENT OFFICE.

THOMAS L. F. STACK, OF DRUMQUIN, IRELAND.

APPARATUS FOR TREATING MILK.

SPECIFICATION forming part of Letters Patent No. 778,717, dated December 27, 1904.

Application filed June 2, 1901. Serial No. 62,949.

*To all whom it may concern:*

Be it known that I, THOMAS LINDSAY FITZ-GEORGE STACK, a subject of the King of Great Britain, residing in Drumquin, county Tyrone, Ireland, have invented certain new and useful Improvements in Apparatuses for Treating Milk, (for which application has been made in Great Britain under No. 6,882 and dated April 1, 1901,) of which the following is a specification.

Hitherto in pasteurizing and separating and like plants the new milk has usually passed by a pipe direct to a suitable heater, where it is raised by the heat of live steam to, say, 150° Fahrenheit from new-milk temperature, then to the separator, and on to the scalder, where it is further raised to 200° Fahrenheit, being finally delivered to a cooler, where it arrives cooled to, say, 65° by parting with its heat to the water circulating round the coil of the cooler. This heated water has hitherto been simply run to waste, and both the heater and the scalder have been heated by live steam. Now my present invention is designed to effect a considerable economy of steam and heat in such treatment, whereby I estimate that a very considerable portion of the coal bills at present necessary will be saved.

The invention will be understood from the following description, reference being had to the accompanying drawings, in which—

Figure 1:
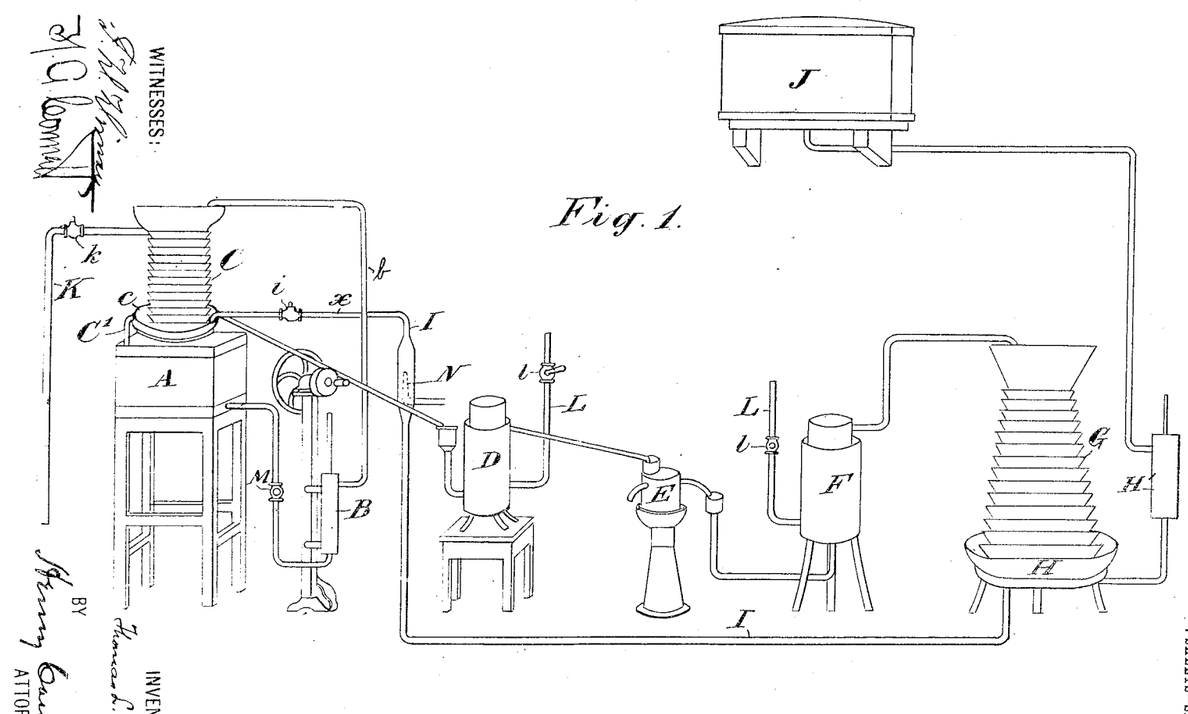
Figure 1 is a general view of the dairy plant with my invention applied thereto.

Referring first to Fig. 1, A is the new-milk tank, where the suppliers' milk is received; B, a pump on the dairy-floor. I take the new milk as received from the milkers and place it in the tank A. From this tank it is pumped by the pump B through pipe $b$ to the top of a preliminary heater C, preferably one similar to the ordinary refrigerator; but in place of cold water being passed through its pipes water heated by cooling the previous supply of milk is passed through its pipes, and this I estimate should raise the temperature of the new milk to 110° or 120° Fahrenheit. This heater C is a device wherein the heating is done by water heated by the heat abstracted from the milk during the cooling operation. The cooled water escaping from the top of the heater C through pipe K can be used for flushing sewers, feeding the boiler, or for any other purposes. The milk having flowed over this heater C will descend to its basin $c$ at foot and thence by a pipe to the heater D, whence its course will be exactly the same as in the plant hitherto employed. This heater D instead of being supplied with steam from the boiler has its jacket or pipes supplied with exhaust-steam from the engine, the whole of the exhaust or shunt from the exhaust passing through pipes L, through the steam jacket or pipes of this heater D, and of the scalder or pasteurizer F, or ordinary live steam can be passed through the jacket of this heater D and of the scalder F in place of exhaust-steam or in conjunction with it, if and when required. Valves $l$ can be used to prevent the steam passing through too quickly. This exhaust-steam will, I estimate, raise the milk through a further 40°—say to 160°—Fahrenheit temperature. From the heater D the hot milk now flows by gravitation to the usual separator E, and from there on to scalder F, which is a known form of scalder. In the scalder F it is heated to near boiling-point—say 200° Fahrenheit—and is passed to the top of cooler G, over which it trickles down to the basin H, round the foot, arriving there cooled to about 65°, its former heat having been parted with to the water circulating round the coil of the cooler. The water from the cooler G thus raised to about 160° Fahrenheit instead of passing into the sewer is passed to the bottom turn of the coil of the heater C through pipe I, round which it will flow in the rising coil, the original head of water in the water-tank J being sufficient to carry it beyond the top of the heater C. If the head should not be sufficient to raise the heated water above the heater C, I may assist the head by pumping or suction through a pump H'. During its passage through the first heater C the water will have parted with its heat to the new milk at 65°, which, I calculate, it should raise to 110° or 120°—that is, through about 50°. This water will pass away to the sewer through pipe K or elsewhere. Then in the second heater the milk will be raised in temperature to, say, 160°, and in the scalder to, say, 200°, and this result I attain by the utilization of heat abstracted in cooling the milk in the cooler G and the application of exhaust-steam to D and F. From my experiments I calculate that whereas the old arrangement required a boiler capable of evaporating from two thousand to two thousand five hundred pounds an hour I shall be able by the present invention to do with a boiler evaporating from eight hundred to one thousand pounds of steam an hour. If the milk is not sufficiently cooled by passing over cooler G, which it reaches on leaving the scalder F, this cooler may be divided into two portions, water from the upper portion being only used to heat the next supply of milk and an additional supply of water being used in the lower portion for still further cooling the milk, or the milk can be passed over a second cooler, which will be hereinafter described with reference to Fig. 11. A valve M also may be used in the pipe from the receiving-tank A to regulate the flow of milk approximately. An overflow $c'$ can be arranged at foot of heater C, so that any surplus milk pumped over C may flow back into the tank A. Regulating-valves $l$ and $k$ can be used on the pipes I and K, carrying water to and from the first heater to prevent air-lock and secure a constant and regular flow of water. I have described this part of my invention as applied to an existing dairy, so as to alter existing plant as little as possible.

Figure 2:
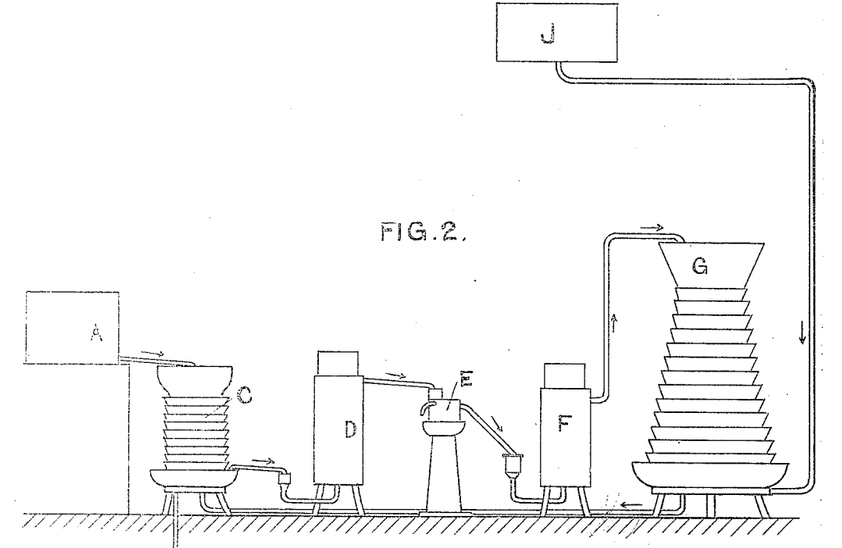
Figs. 2 and 3, the same, embodying slight alterations.
Figure 3:
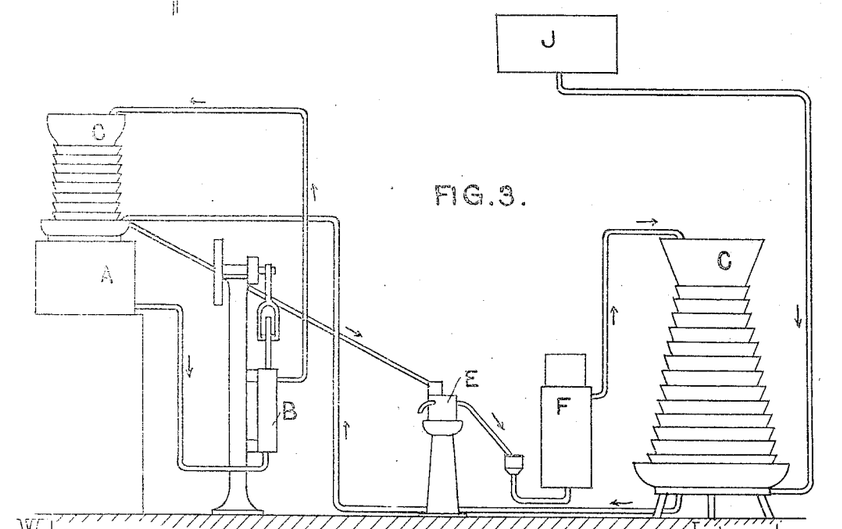

I could arrange the heater C on the floor-level, as shown in Fig. 2, and bring the milk from the receiving-tank A by gravitation to the heater C; but in such case it would be placed below the level of the tank and near the floor of the dairy, where it is heated by the warm water from the cooler G. In such case a pump, such as B of Fig. 1, would not be required. Then the milk passes to the lifting-heater, such as D, which raises it over a separator E, from which it passes as before to a scalder or pasteurizer F, and from thence to the cooler G. The second heater D may, if desired, be dispensed with in some cases. In such case the preliminary heater C can be placed over the tank A, as shown in Fig. 3; but the second heater D is entirely omitted, the heat formed in the preliminary one, C, being sufficient for separating without further increase. The milk in such case flows from the heater C direct to the separator E, after leaving which the course of the milk is the same as before described. The water circulates as before. I may also introduce a steam or hot-water pipe or jet N in the pipe I, (see Fig. 1,) conveying water from the cooler G to the first heater C, and thus make the first heater C hot enough to enable me to dispense with the heater D.

Figure 4:
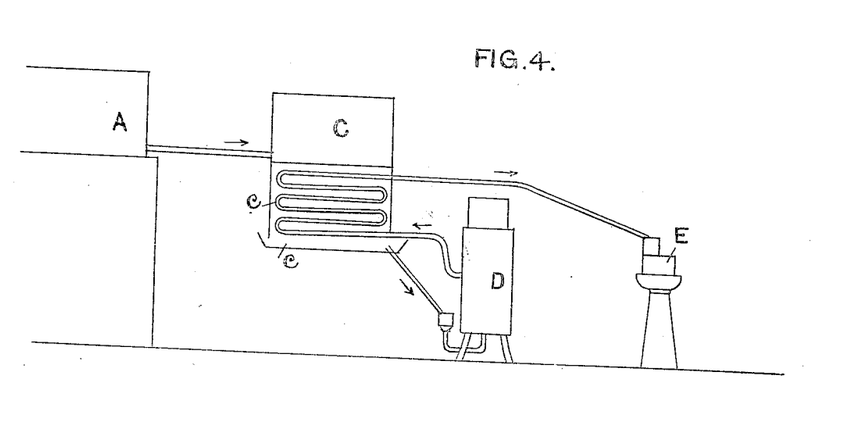
Fig. 4, a dairy plant in which the heating of the new milk is done by the separated or treated milk itself during its cooling operation.

It is obvious that, if desired, the heated milk instead of being passed to the cooler G may be delivered to the coil or jacket of the preliminary heater C and there undergo a cooling treatment by having its heat utilized to heat the new milk passing to the heater. A good system of arrangement on this variation is shown in Fig. 4. The new milk is received in the tank A, whence it flows to the preliminary heater C, over which it trickles at top to a basin $c$ at bottom. This heater C is one wherein the cooling of the treated milk is effected by having its heat utilized to heat the new milk. On entering this heater C the milk is, say, at 50°, and on leaving it it has been raised to 110° by the hot milk passing through the coils of pipe. From the foot of this heater C the now warm milk passes to the lifting-heater D, whence it is returned to the pipes of the first heater C at, say, 200°. In rising through the coils $c$ of the first heater it is gradually cooled down by the cold milk flowing outside to, say, 140°, and at that temperature it passes to the separator E and is thenceforward treated as in ordinary dairies. It is advantageous in most cases, and more particularly where the milk is used as heating medium, that the preliminary heater C should be of a construction allowing ready access to the interior for cleaning purposes.

Figure 11:
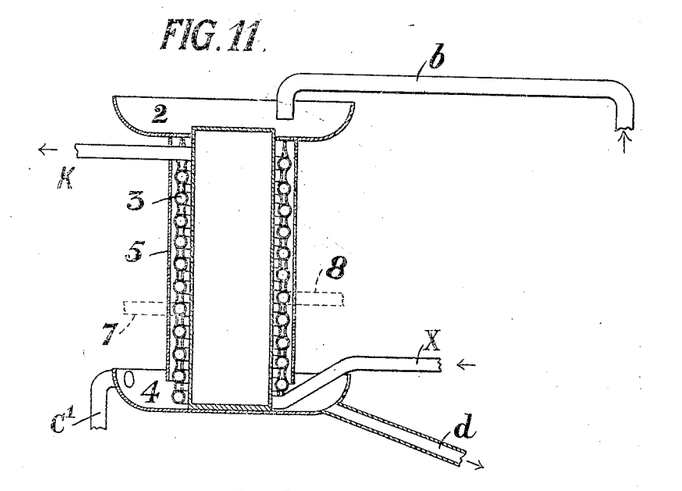
Figs. 11 and 12 are sectional views, showing the construction on a larger scale, of the parts C and G and D and F.
Figure 12:
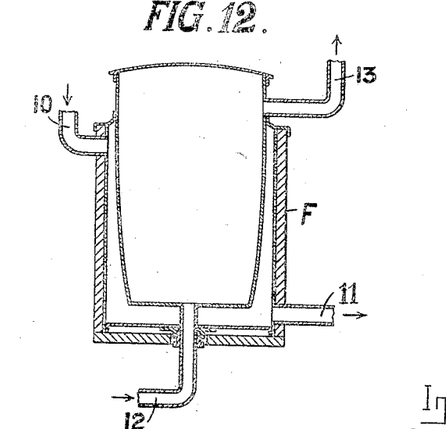

The heater C, hereinbefore referred to, is illustrated in the principal figures in a conventional manner. In Fig. 11 it is shown in detail and will now be described. 2 is a distributer or funnel at the top of the apparatus; 3, a series of spiral pipes contained within a movable casing 5. This casing 5 is removed in the other figures, and it is quite optional whether it be supplied or not. The casing 5 if used, however, covers the pipes and helps to retain the heat and prevent splashing. Through these pipes 3 the hot fluid is passed, and outside them the new milk flows from the distributer 2 in a thin layer to the tray 4. An inlet, such as X, is provided at one end of the apparatus, so that the liquid will enter the apparatus, pass through in bulk in a circuitous path, thus giving out the greatest heat possible during its passage, and then escape through the outlet K. The new milk is fed into the distributer 2 at the top of the apparatus through pipe b, whence it flows by gravitation to the receiver 4 at foot, having passed down the outside of the pipes 3 within the outside casing 5 and having been heated by the hot fluid flowing inside. From the foot of this heater the warm fluid is led away by pipe D for further treatment. d' is the overflow-pipe. The cooler G (shown in Fig. 1) is constructed on precisely the same lines; but in the case of it being required to be divided into two compartments, as previously mentioned, I can arrange it with the pipes 7 and 8. (Shown in dotted lines.) In such case the fluid rises from X through about one-third the height of the apparatus, and here the fluid emerges through pipe 7. Fluid is also passed through pipe 8 into the apparatus and delivered through pipe K, and thus the two coolers are combined in one instead of being separate or placed apart. The character of the scalder or pasteurizer F is shown in Fig. 12. This scalder or pasteurizer has exhaust-steam supplied to its jacket from the engine through pipe 10 and delivered therefrom through pipe 11, and hot milk flows by gravitation into pipe 12, where it is heated to near boiling-point and then passed through pipe 13 to the top of the cooler G. The heater D is constructed on precisely the same lines as this scalder F.

Figure 5:
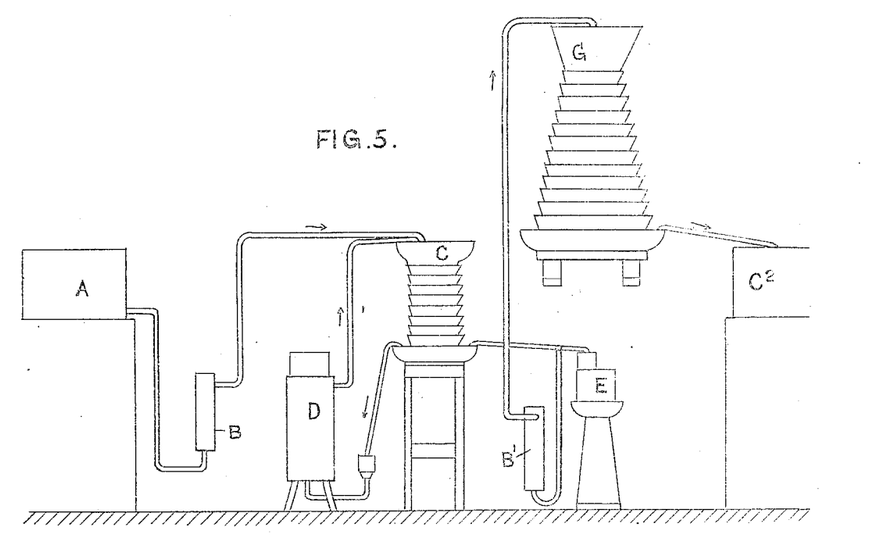
Figs. 5 and 6, an elevation and plan of a dairy plant wherein there is only one lifting-heater and wherein the milk is not separated at a higher temperature than 140° to 170° Fahrenheit.
Figure 6:
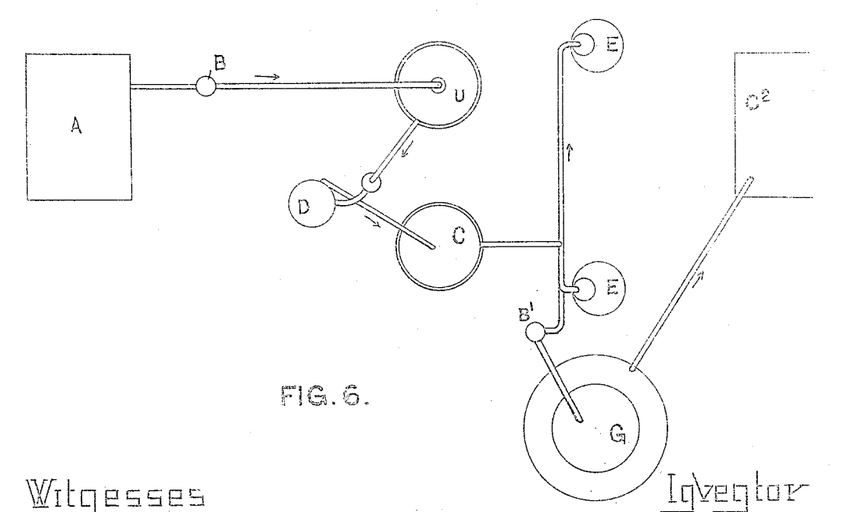
Figure 7:
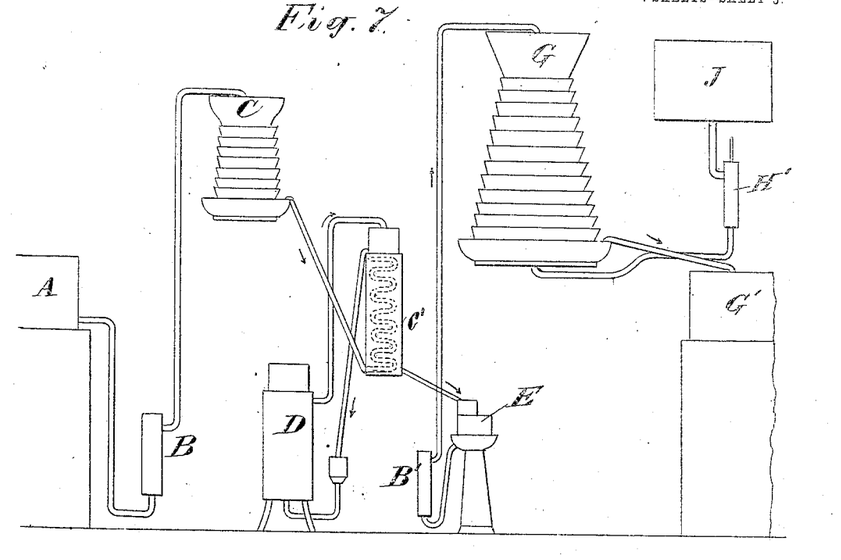
Figs. 7 and 8, an elevation and plan of a dairy plant wherein only one lifting-heater is required.
Figure 8:
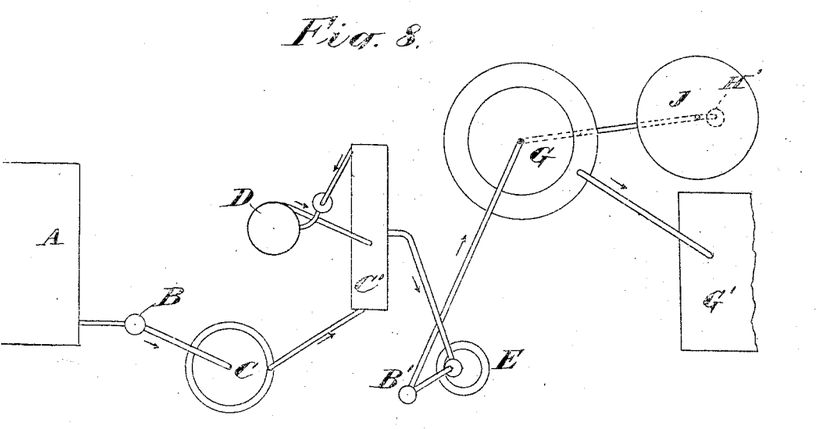
Figure 9:
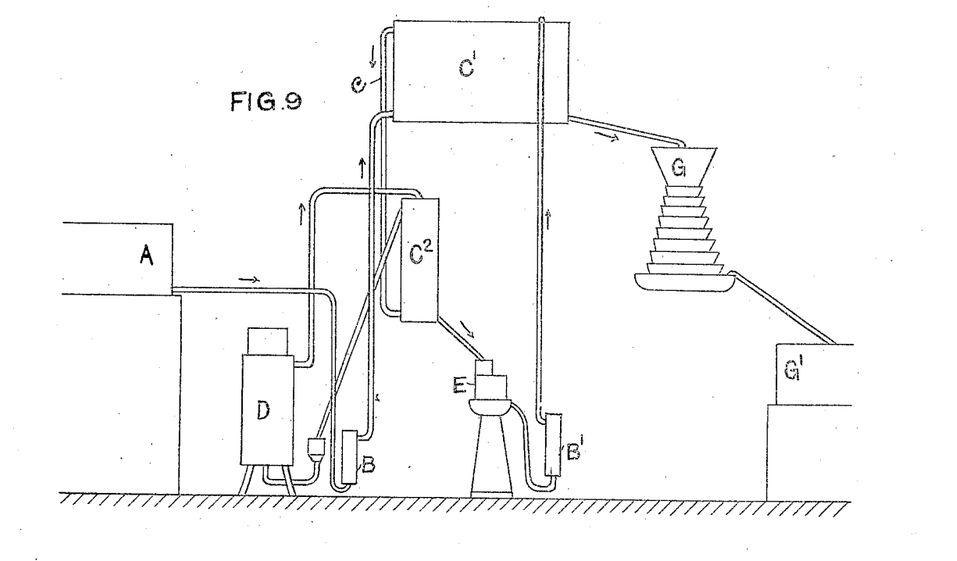
Figs. 9 and 10, an elevation and plan of a dairy plant in which part of the exhaust-steam has only to raise the milk about 10°, leaving the remainder of the exhaust and all the live steam free for other uses.
Figure 10:
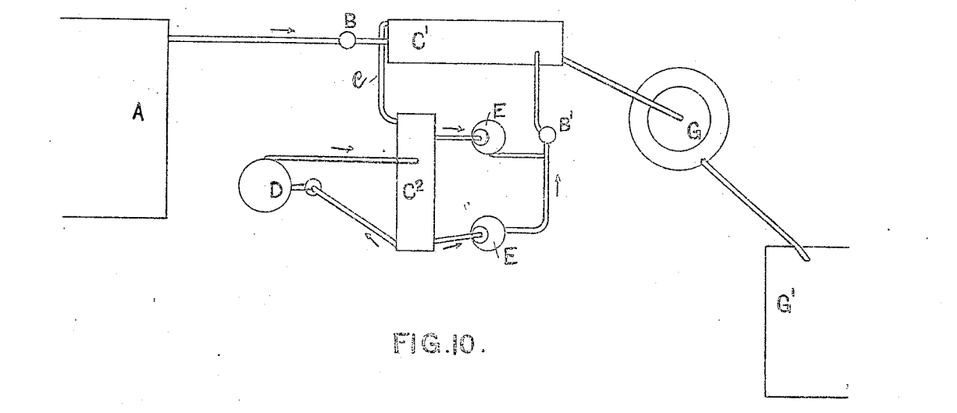

In some cases it would be desirable to use only one lifting-heater, as such heaters or "scalders," as they may generally be called, are expensive. It is also desirable not to separate milk at a higher temperature than 140° to 160° or 170° Fahrenheit, while at the same time pasteurizing all the milk and cream. I have designed an arrangement to meet these requirements. (Shown in Figs. 5 and 6.) The new milk is received from a tank A at a temperature of, say, about 50° and is raised by the pump B over the heater C. On entering the heater the milk is, say, at 50° Fahrenheit and on leaving it at 100°. It then goes to the lifting-heater D, where it is raised to, say, 200° and lifted by centrifugal force over the cooler C, where it is cooled to, say, 140°. It then passes to the separators E, where the cream is separated. The separated milk then passes to the pump B', where it is lifted over the cooler G, if desired, and from the foot of this cooler it flows by gravitation to the separated-milk tank G'. The water from the cooler G can, either all or any part, as desired, be led through C, so as to cool the milk, if desired, before separation, say, to 160° or 170°, and this water passes to the heater C for heating the new milk, or, referring to Figs. 7 and 8, the milk can be received in the tank A at, say, 50°, thence pumped by a pump B over the heater C, where it is raised by the hot water flowing inside to, say, 110°. Thence it flows by gravitation to the foot of the heater C', through the interior of which it ascends and emerges at, say, 160°, being heated by the hot milk flowing outside, then descends to the foot of the lifting-heater D, where it is raised to, say, 210° and lifted over the receiver on top of the heater C'. It now trickles over the outside of this and is cooled by the milk passing inside to, say, 160°, at which temperature it passes to the separator E, where the cream is separated. The separated milk is then lifted by a pump B' over the cooler G, where it is cooled down to, say, 60° by the water flowing inside and at this temperature arrives at the separated-milk tank G'. As regards the water, it is first lifted by a pump H' (seen in Fig. 7) to the water-tank J, whence it flows by gravitation to the foot of the cooler G at, say, 50°. It then rises through the helix, round the cooler G, and arrives at the top at a temperature of, say, 120°. Thence it flows through the coil of the heater C, raising the temperature of the cold milk flowing outside, and finally emerges at, say, 60°. This method practically utilizes all waste heat, the exhaust-steam being sufficient to raise the temperature of the milk in the lifting-heater D from, say, 160° to 210°; but live steam can be used in the jacket of the heater D also, if and when required, either alone or in conjunction with the exhaust. This method requires perhaps less heat than any of the preceding without going to very large heaters or coolers and has besides the advantage of requiring only one lifting-heater, thus saving expense and also the trouble of cleaning and maintenance. The head of water is sufficient to carry it through the whole course indicated.

Where great economy is required, new milk can be received in the tank A. (Shown in Figs. 9 and 10.) It is then lifted by the pump B to the foot of the heater C', where it enters the lowest pipe, and emerges through the top pipe at, say, 150°, having been heated by the hot milk flowing outside. Hence it flows by gravitation in a pipe C to the end of the lowest pipe of another heater, C², through which it rises by its own pressure and emerges at, say, 200°, having been further heated by the very hot milk flowing outside the said heater C². It then enters the foot of a lifting-heater D, where the separated milk is raised by steam (live or exhaust) to, say, 210° and lifted over the distributer of the last-named heater C², over which it trickles, arriving at the foot outside at, say, 160°, whence it is led to the separators E. Having been separated at 160°, it is lifted by the other pump, B', over the first heater C', being cooled by the cold milk flowing inside. It arrives at the foot of this heater at 60°. Thence it passes over a smaller cooler G, in which a large quantity of cold water—say at 50°—circulates, and so ultimately arrives at the separated-milk tank G' at, say, 51°. In this design the steam has only to raise the milk about 10°. This should only require a part of the exhaust, leaving the remainder and all the live steam free for other uses.

The whole treatment is done with only one lifting-heater, and yet the entire milk and cream of the dairy, even for two separators, is pasteurized at the highest possible temperature and cooled to the lowest also without using artificial cold.

In any of the foregoing operations the hot fluid may flow outside and the cold inside, or vice versa. The efficient surface areas in any of the heaters or coolers may be reduced, if and when desired, by closing one or more holes in the distributing basin or tank.

I declare that what I claim is—

1. In an apparatus for treating milk, the combination of a preliminary heater for the milk, a separator, a secondary heater, a scalder, a cooler for the heated milk, means for supplying the secondary heater with steam for heating it, and a pipe which conveys the hot water from the cooler to the primary heater for heating the milk which passes through the same.

2. In an apparatus for treating milk, the combination with means for separating, pasteurizing and cooling the milk, of a heater for the milk, the heating-coils of which are connected by a pipe, for supply, from the coil of the cooler, the said pipe, and means for admitting a jet of steam to said pipe to augment the heat.

3. An apparatus for treating milk, having a heater consisting of an elevated distributer for the new milk, a pipe arranged in a vertical coil under said distributer so as to form a tortuous passage for the heating liquid, an inlet to said pipe at bottom, an outlet at top thereof, perforations in the bottom of the distributer through which the milk flows by gravitation down the outside of the pipes, and a receiving-tray at the bottom, substantially as set forth.

In witness whereof I have hereunto signed my name, this 23d day of April, 1901, in the presence of two subscribing witnesses.

T. L. F. STACK.

Witnesses:
STIRLING J. LEEDS,
RICHARD A. MORGAN.